United States Patent [19]

Key

[11] Patent Number: 5,299,462

[45] Date of Patent: Apr. 5, 1994

[54] RACQUET STRING ACTUAL TENSION MEASURING DEVICE

[76] Inventor: David L. Key, 10031 Carmona Ct., Cupertino, Calif. 95014

[21] Appl. No.: 987,380

[22] Filed: Dec. 8, 1992

[51] Int. Cl.$^5$ .............................................. G01L 5/04
[52] U.S. Cl. .................................. 73/862.391; 73/828; 273/73 D
[58] Field of Search ............... 73/862.391, 862.392, 73/862.393, 862.42, 862.43, 862.452, 828; 273/73 A, 73 B, 73 D, 73 E; 84/454, 455

[56] References Cited

U.S. PATENT DOCUMENTS

| | | | |
|---|---|---|---|
| 3,823,609 | 7/1974 | Miyagawa et al. | 73/862.43 |
| 3,831,442 | 8/1974 | Cummins et al. | 73/144 |
| 3,964,291 | 6/1976 | Ogden | 73/862.43 X |
| 4,077,256 | 3/1978 | Hollander | 73/145 |
| 4,375,180 | 3/1983 | Scholz | 73/862.393 X |
| 4,805,467 | 2/1989 | Bartholomew | 73/862.393 X |
| 4,876,900 | 10/1989 | Carney et al. | 73/862.48 |
| 5,007,294 | 4/1991 | Matjasic | 73/862.41 |
| 5,048,352 | 9/1991 | Ugarte | 73/862.45 |

FOREIGN PATENT DOCUMENTS 0861989 9/1981 U.S.S.R. ............... 73/862.42

*Primary Examiner*—Richard E. Chilcot, Jr.
*Assistant Examiner*—Elizabeth L. Dougherty

[57] ABSTRACT

A method for measuring the actual tension in an elastic string such as in a strung racquet. The method comprises holding one length of string (42) substantially a constant length, and measuring the force (58) required to maintain this length, while the tension in an adjacent section of string (36) is reduced to zero. Once the tension in the adjacent section of string has been reduced to zero, the force maintaining the first section of string a constant length is an indication of the actual string tension.

17 Claims, 3 Drawing Sheets

RACQUET STRING ACTUAL TENSION MEASURING DEVICE

BACKGROUND OF THE INVENTION

This invention relates to stringing racquets, specifically a means for measuring the actual tension of the strings in a strung racquet.

To illustrate the current situation of measuring the tension of the strings in a strung racquet it is appropriate to quote the 1992-1993 Stringer's Digest, a publication of the U.S. Racquet Stringers Association.

Dictionary of Terms:
ACTUAL TENSION: The tension of the strings in the strung racquet. Actual tension will consistently be lower than REFERENCE TENSION (the tension commonly specified by racquet manufacturers and players) due to numerous variables—such as ELONGATION and friction. Actual tension can be less than the reference tension by as much as 5-25%. Actual tension will continue to decrease over a period of time due to a strings' stretch, loss of resilience and wear.

Shortly after stringing, the actual tension will depend on the stringer's technique, the characteristics of the stringing machine, and the properties of the string being used. If the actual tension can be as much as 25% less than the reference tension, a reference tension of 27 kg (60 lb) could result in an actual tension as low as 20 kg (45 lb). This is a big variation and would have a noticeable impact on even a beginner's game. Experienced players would like to control their racquet tension to within 1.4 to 2.3 kg (3 to 5 lb). It would be extremely valuable to be able to measure the actual tension after the racquet has been strung so that this variable could be eliminated for the players.

After some use, because of a natural loss of tension and elasticity, a racquet will eventually need restringing, even if a string has not broken. A frequently heard guide is "to restring as many times in a year as the racquet is played with in a week". This is obviously a very rough guide. Many factors will influence the need for new strings. For example, a hard hitter will cause faster deterioration in the strings than a soft hitter, and strings are made in a range of quality, gauge, strength, endurance, and elasticity. Clearly a measure of the actual tension would give a good indication of the time to restring.

Current string tension testing devices do not measure the actual tension. There are three basic ways in which existing devices get a measurement which is related to, but not the same as the actual tension:

(a) a measurement of the force required to deflect the string face a predetermined distance (or the distance deflected by a predetermined force)

(b) a measurement of the torque required to deflect a short length of string through a predetermined angle (or the angle deflected by a predetermined torque).

(c) a measurement of the string's natural frequency of vibration.

All of these methods are influenced by the string elasticity. One manifestation of method (a) has a means of (roughly) restricting the deflection to a standard length of string, but (b) and (c) will depend on the string length. Methods (a) and (c) will be influenced by the string pattern and the friction between strings. The best that can be said about these methods is that they will give a relative indication of the tension.

Accordingly there is a real need for a device which measures the actual tension.

Accordingly, several objects and advantages of my invention are:

(a) to provide a direct measurement of the actual tension.

(b) to provide a measure of the tension in any particular string (c) to provide a measure of string tension which does not depend on the string properties such as its length, or its elasticity.

(d) to provide a measure of string tension which does not depend on the size of the racquet, or the density of stringing, (e) to provide a measure of string tension which can be used directly to decide whether or not the racquet needs to be restrung.

(f) to provide a measurement device which can be made in various sizes, and adjustable, so that the tension on almost any string on a tennis, racquetball, squash, badminton, or any other racquet could be measured.

Further objects and advantages of my actual tension measuring device will become apparent from a consideration of the drawings and ensuring description.

DETAILED DESCRIPTION OF THE PREFERRED EMBODIMENT

This invention evolves directly from a fundamental concept of tension in an elastic string. This concept is applied to a racquet actual tension measuring device as follows:

1. Clamp the string at one location.
2. Accurately maintain the length of the string between the racquet rim and one side of the clamp
3. while removing the tension in a section of string on the other side of the clamp.
4. When the tension on the other side has been reduced to zero, the force required to maintain the length of string between the rim and clamp substantially constant, will be equal to the original actual tension.

Figure 1:
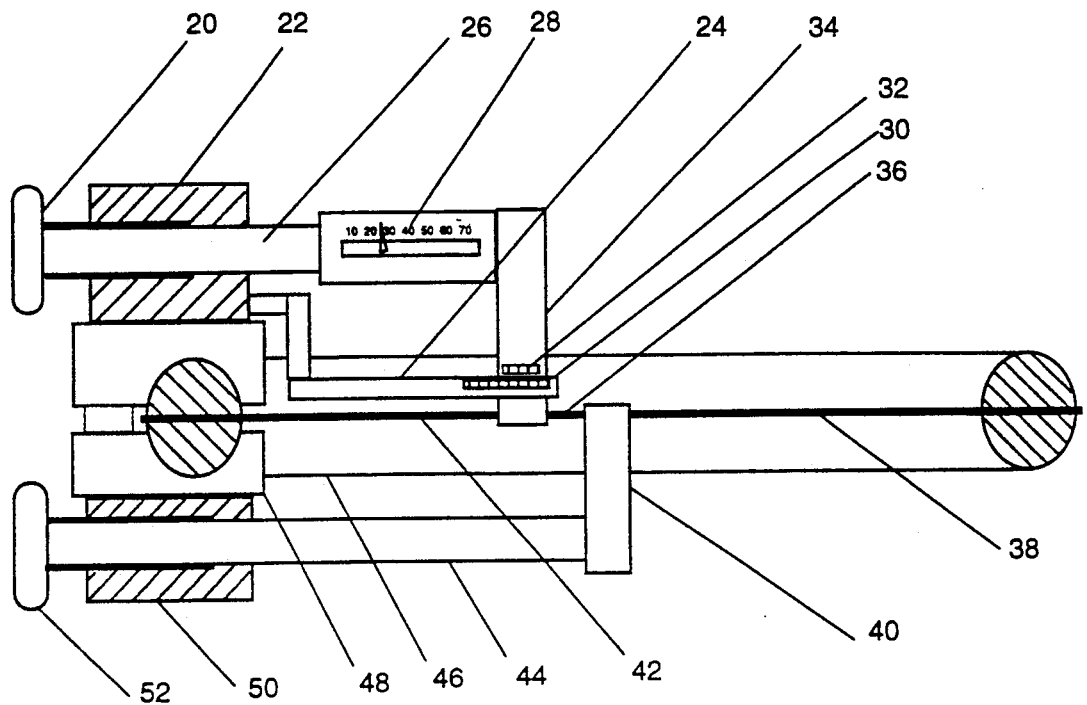
FIG. 1 shows an actual tension measuring device which uses a rim mount, a spring balance and a vernier gauge.

FIG. 1 shows a section through a tennis racquet with one form of an actual tension measuring device attached.

The racquet rim 46 is gripped by a rim clamp 48. Attached to the rim clamp through a quick adjustment device 22, is a tension bar 26. Connected to the tension bar 26, is a compression force measuring device such as a spring balance 28. The spring balance is connected to a string clamp 34. The length of the tension measuring bar can be adjusted by a length adjustment device 20. A reference beam or arm 24 is attached to the same quick adjustment device 22 as the tension bar 26. A vernier scale 30 is inscribed on the end of the reference arm 24 in such a way as to overlap the corresponding scale 32 on the tension string clamp 34.

A second string clamp, the unloading string clamp 40 grips the string a small distance away from the tension string clamp 34. This unloading string clamp is attached to an unloading bar 44 mounted on a quick adjustment device 50 which in turn is attached to the rim clamp 48. The length of the unloading bar can be adjusted using a load adjustment device 52.

The length of string between the racquet rim and the tension string clamp will be called the actual tension string 42, the adjacent length called the zero tension string 36, and the third section, the stretched string 38.

The quick adjustment devices 22 and 50 are attached to the rim clamp 48 in such a way as to allow quick adjustment of the string lengths 36, 38, and 42, when being mounted on the racquet.

As described in background, existing tennis racquet string tension measuring devices do not measure the actual tension. They rely on measuring a calibrated deflection of the string in response to a reference force, or a calibrated force in response to a reference deflection. This can be achieved either by applying a torque in the plane of the strings, or a force perpendicular to the plane of the strings. My invention applies a completely different concept which evolved from considering a basic definition of tension:

Define string tension as follows: If a string under tension is cut, the force in each direction required to hold the ends together is the "tension".

My invention evolves directly from this definition of tension. The principles are applied to a racquet actual tension measuring device as follows:

1. Clamp the string at one location.
2. Accurately maintain the length of the string between the racquet rim and one side of the clamp
3. while removing the tension in a section of string on the other side of the clamp.
4. When the tension on the other side has been reduced to zero, the force required to maintain the length of string between the rim and clamp substantially constant will be equal to the original actual tension.

In the first embodiment and refering to FIG. 1, these functions would be achieved as follows:

The racquet 46 is placed in the racquet rim clamp 48. Tension string clamp 34 and unloading string clamp 40 are attached to the string being measured. The quick adjustment devices 22 and 50 are used to facilitate this process and then locked to the rim clamp 48. The load adjusting device 52 is used to move the unloading clamp 40 in the direction which stretches the stretched string 38 and shortens the zero tension string 36. Simultaneously the length adjustment device 20 is used to increase the force exerted by the spring scale 28 and maintain the reference length as indicated by the vernier scale 30,32. When the tension in string 36 has been reduced to zero, the force being resisted by the tension measuring bar 26 will be equal to the original string tension, and will be registered on the spring scale 28.

For maximum accuracy it is necessary that the length of the actual tension string 42 be accurately maintained when the zero tension string 36 is unloaded and the tension reading is made. The impact on tension accuracy can be illustrated by the following calculations.

Assume the string used in the racquet has an elasticity such that 25.4 cm (10 inches) of string extends 2.54 cm (1.0 in) with a load of 27.27 kg (60 lb). Assume that the clamps are placed on a 26.7 cm (10.5 in) string such that the actual tension string 42 is 15.24 cm (6.0 in) long, the zero tension string 36 is 1.27 cm (0.5 in) long, and the stretched string 38 is 10.16 cm (4.0 in) long. The stretch in zero tension string 36 is 0.127 cm (0.05 in). Thus if stretched string 38 is stretched an extra 0.127 cm it will unload zero tension string 36. The extra tension in 38 due to being stretched an extra 0.127 cm will be 3.4 kg (7.5 lb) (using Hook's Law) to give a total tension of 30.68 kg (67.5 lb). This is a reasonable increased load for the string to experience without any damage.

If the length of the actual tension string 42 was allowed to change, it would thereby change the tension. This change in tension in the actual tension string 42 will be (again using Hook's Law) 17.9 kg/cm (100 lb.in). Thus for measurements to be accurate to 1.0 kg (2.2 lb), the length of 42 will have to be maintained to within 0.056 cm (0.022 in).

This accuracy is dependent on the elasticity of the string and the length of the actual tension string 42. For example, if the elasticity of the string was doubled to give 5.08 cm (2.0 in) stretch in a 24.5 cm (10 in) length under a load of 27.27 kg (60 lb), then the accuracy would be 8.95 kg/cm (50 lb/in). Similarly if the elasticity was as in the first example, but the length of the actual tension string 42 was increased from 15.24 cm (6 in) to 20.32 cm (8 in), the accuracy would be 12.52 kg/cm (70 lb/in).

Clearly then the length of the actual tension string 42 should be as long as possible, but at the same time the length of the stretched string 38 must not be too short since it has to be stretched to remove the tension in the zero tension string. The zero tension string 36 can be kept quite short, one string space is sufficient.

There are several configurations and combinations thereof which can be used to achieve the purpose of this invention.

Figure 2:
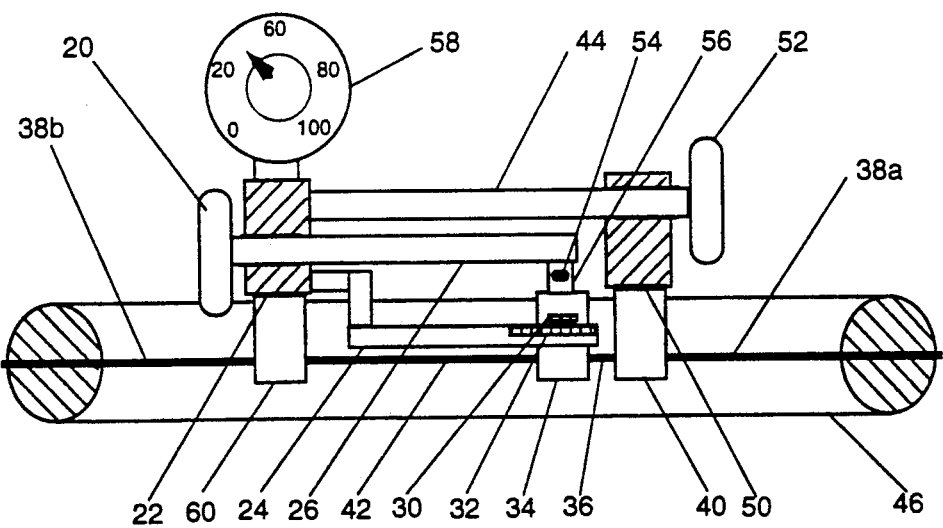
FIG. 2 shows an embodiment mounted away from the racquet rim and utilizing a strain gauge.

The second configuration will illustrate several other possibilities. In this example, instead of making use of the rim to isolate the string section and act as the anchor, the device is mounted entirely on the string. Also, instead of using a spring balance to measure the tension, a strain gauged beam and display is used. FIG. 2 shows a section through a tennis racquet with the second form of an actual tension measuring device attached.

The racquet string to be measured is gripped by three spring clamps 34, 40, and 60. Attached to the reference string clamp 60 through a quick adjustment device 22, is a tension bar 26. Connected to the tension bar 26, is a compression force measuring device such as a strain gauge beam 56 with a strain gauge 54 mounted on it. The calibrated strain gauge signal is shown on a force display 58. The strain gauge beam 56 is connected to a string clamp 34. The length of the tension bar 26 can be adjusted by a length adjustment device 20. A reference beam or arm 24 is attached to the same quick adjustment device 22 as the tension bar 26. A vernier scale 30 is inscribed on the end of the reference arm 24 in such a way as to overlap the corresponding scale 32 on the tension string clamp 34.

A third string clamp, the unloading string clamp 40 grips the string a small distance away from the tension string clamp 34. This unloading string clamp is attached to an unloading bar 44 through a quick adjustment device 50. The other end of the unloading bar 44 is attached to the reference string clamp 60 through the quick adjustment device 22. The length of the unloading bar can be adjusted using a load adjustment device 52.

The length of string between the reference string clamp 60 and the tension string clamp 34 will be called the actual tension string 42, the adjacent length called the zero tension string 36, and the third section, the stretched string 38. In this case the stretched string 38 is made up of two pieces 38a and 38b.

The quick adjustment devices 22 and 50 are attached to the reference string clamp 60, and the unloading string clamp 40 respectively, in such a way as to allow quick adjustment of the string lengths 36, 42, and 38a and 38b, when being mounted on the racquet.

With the geometry shown, the strain gauge 54 will be sensitive to forces on the strain gauge beam 56 caused by the difference in tensions in strings 42 and 36. It is important that the tension bar 26 be rigid so that the said bending moment sensed by the strain gauge will be substantially independent of the length of the tension bar 26. With this situation there will be considerable leeway in setting the length of string 42, without recalibration of the strain gauge.

The second embodiment uses the same principles as the first embodiment described above. With the modified arrangements, these functions would be achieved as follows, refering to FIG. 2:

The actual tension measuring device is attached to the string to be measured by the reference string clamp 60, the tension string clamp 34, and unloading string clamp 40. The quick adjustment devices 22 and 50 are used to facilitate this process and then locked. Similar precautions apply to setting string lengths as in the first configuration. In this case however, the effective length of the stretched string 38 is 38a plus 38b, since the tensiometer is free floating on the string. If such a configuration is mounted on a base such as a stringing machine, then there must be allowance for the tensiometer to move freely, parallel to the string. The load adjusting device 52 is used to move the unloading clamp 40 in the direction which stretches the stretched strings 38a and 38b, and shortens the zero tension string 36. Simultaneously the length adjustment device 20 is used to maintain the reference length as indicated by the vernier scale 30,32. The load being carried by the tension measuring bar 26 will be measured by the strain gauge 54 mounted on the beam 56 and will register on the display 58. When the tension in string 36 has been reduced to zero, the force being resisted by the tension measuring bar 26 will be equal to the original string tension, and will be registered on the display 58.

Figure 3:
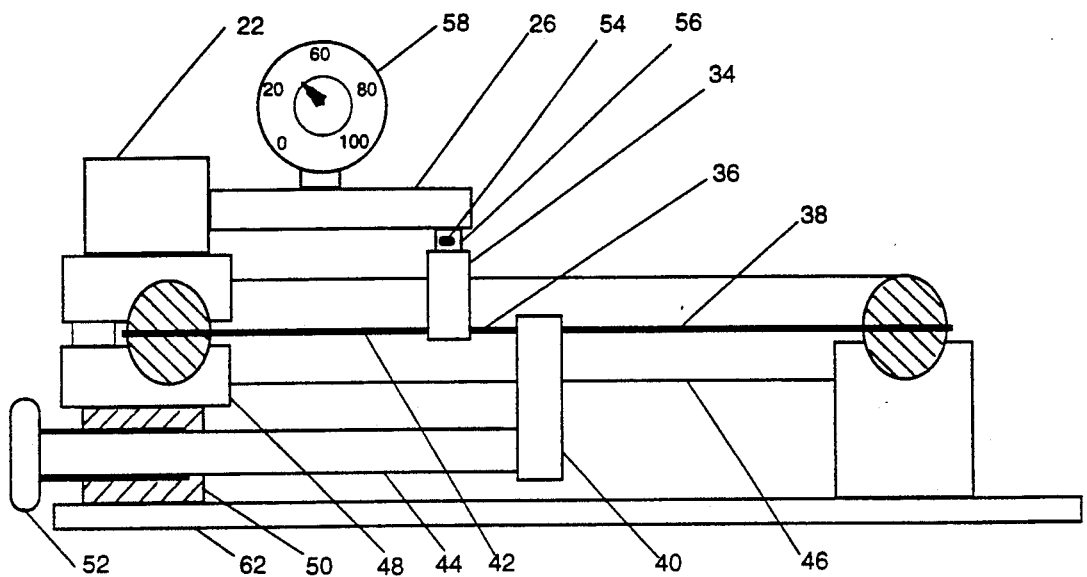
FIG. 3 shows an embodiment utilizing a rim mount and utilizing a strain gauge, but without a length adjustment device.

The third configuration is shown in FIG. 3. This version uses the rim mounting of configuration 1, and shows how a base could be incorporated. It utilizes a strain gauged beam as in configuration 2, but the features used to maintain the reference length are omitted. Instead, the tension bar 26 is rigidly attached to the quick adjustment device 22. The assembly of these components, (22, 26) the strain gauge beam 56, and the tension string clamp 34 is made sufficiently stiff that only very small changes in reference length occur when supporting the actual tension. The assembly 22, 26, 34, 56 is then calibrated to determine the deflections under load and the calibration of the strain gauge adjusted as follows:

Assume the assembly 22, 26, 34, 56 is made to give an actual tension string 42 length of 15.24 cm (6 in) and string elasticity is the same as described in operation of configuration 1 (17.9 kg/cm, 100 lb/in). Then if assembly 22, 26, 34, 56 deflects 0.127 cm (0.05 in) under 27.27 kg (60 lb), the string load could relax 2.27 kg (5 lb). Hence the strain gauge reading should be increased by 2.27 kg (5 lb). Similar corrections to the strain gauge calibration can be made for the range of tension loads to be covered.

This is an approximate correction, but should be accurate to within a fraction of a kg for strings with elasticity in the range assumed.

Operation of this embodiment is fundamentally as for configurations 1 and 2, except that the steps to maintain the reference length are omitted.

Figure 4:
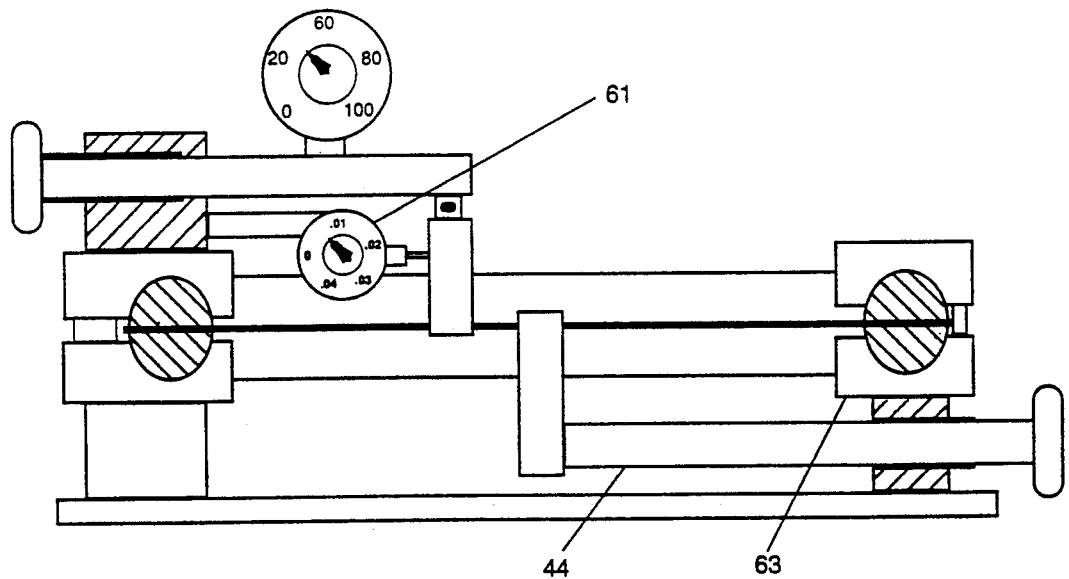
FIG. 4 shows an embodiment which uses a rim mount at both ends of the string and also utilizes a strain gauge, and a dial gauge.

The fourth configuration is shown in FIG. 4. This embodiment has two changes from configuration 3: The unloading bar 44 mounting and adjustment is moved to the rim on the opposite end of the string to the tension measuring bar and therefore uses an extra rim clamp 63. Also, the reference arm vernier gauge is replaced by a dial gauge 61.

Operation of this embodiment is fundamentally as for configurations 1 and 2, and will not be repeated.

The fifth configuration introduces another logical extension, the use of a hydraulic system to measure the force in the tension bar and to load the unloading bar. It is illustrated for convenience on configuration 4, but could be incorporated into the basic layouts of 1, 2, or 3.

Figure 5:
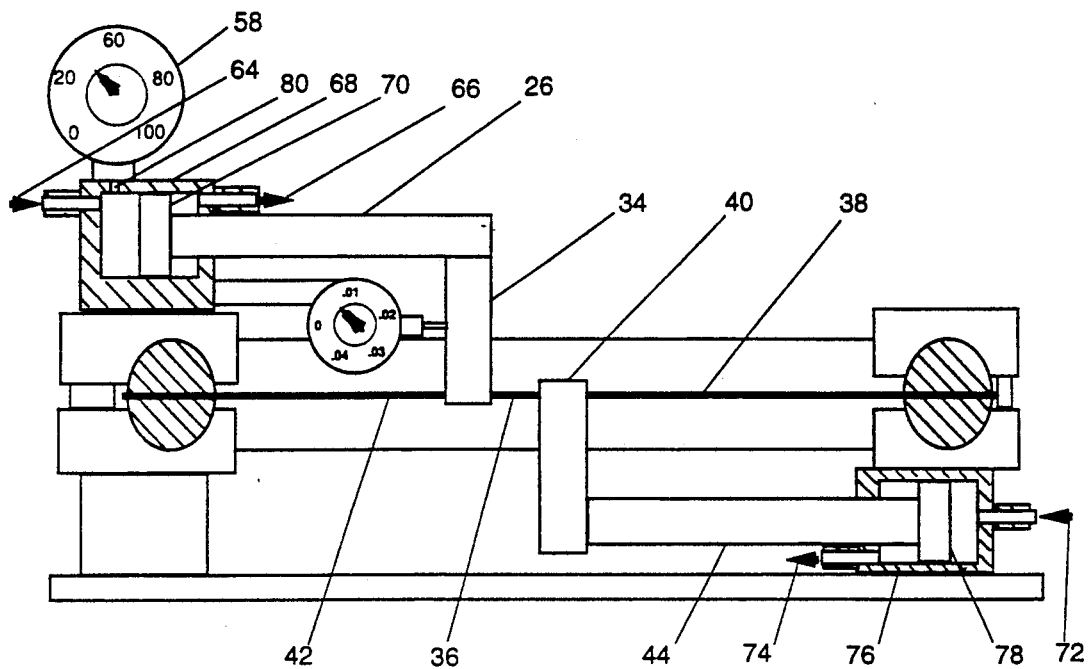
FIG. 5 shows an embodiment which uses a hydraulic system to apply the tension unloading force and maintain the length of the actual tension string.

FIG. 5 shows the fifth embodiment. Only the differences from configuration 4 will be described.

One end of the tension bar 26 is connected directly to the tension string clamp 34. The other end is connected to a hydraulic piston 70 inside a cylinder 68. Pressure is ported to the supply side 64 and released through the return port 66. The force generated by the supply pressure on the tension piston 70 is measured by a calibrated pressure gauge connected to the pressure tap 80. The resulting force is displayed on the force display 58. The unloading bar 44 is connected to a hydraulic piston 78 inside a cylinder 76. Pressure is ported to the supply side 72 and released through the return side 74. A means of generating and porting these two pressure supplies is considered routine and not shown.

The racquet is mounted in the rim clamps with the string clamps attached as in configuration 4. Pressure is ported to the unloading supply 72 so that the pressure on the piston 78 forces the unloading string clamp 40 to increase the length of the stretched string 38. Simultaneously, pressure is ported to the tension supply 64 so that the pressure on the piston 70 balances the force from the tension string 42 and the length of the actual tension string 42 is maintained constant. When the tension in the zero tension string 36 has been reduced to zero, the balancing force indicated in the force display 58 will equal the actual string tension.

Figure 6:
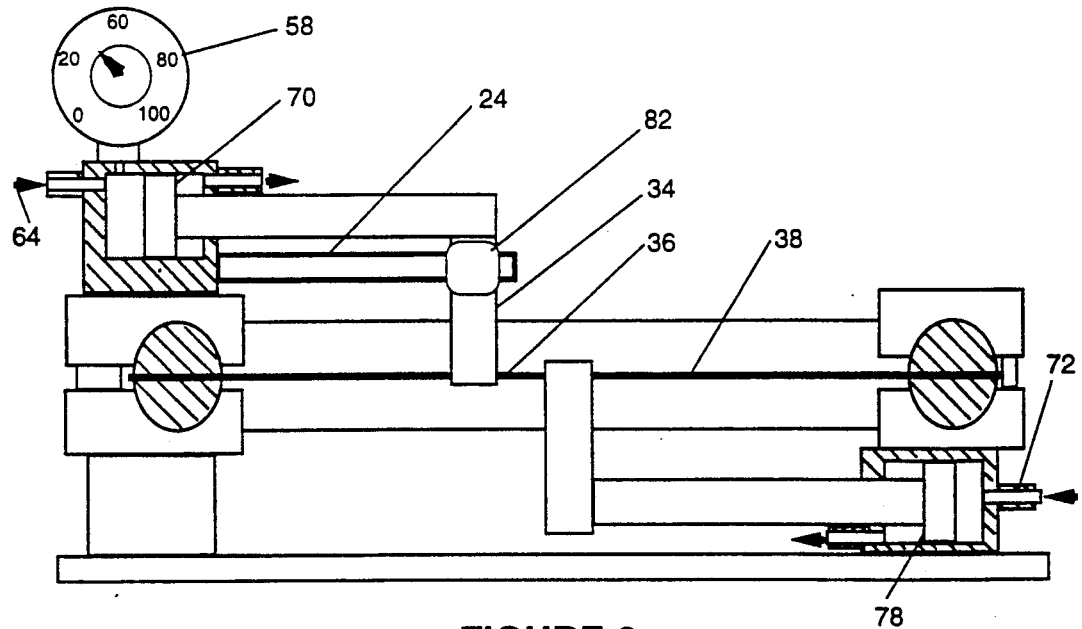
FIG. 6 shows how a linear position transducer could be incorporated to automatically maintain the length of the actual tension string.

The sixth embodiment will describe a logical extension to incorporate sensors and a servo to automatically control the supply pressure to the tension piston so as to maintain the length of the actual tension string. The extra component required is a linear position transducer 82, arranged as shown in FIG. 6.

As with the embodiment shown in FIG. 5, load pressure supply 72 is ported to the unloading piston 78 so as to increase the length of the stretched string 38. A linear position transducer 82 mounted on the tension string clamp 34 measures the deflection of the clamp relative to the reference arm 24. This signal is sent to a servo-valve which controls the pressure to the tension supply 64. When an increment in load pressure supply 72 does not result in an incremental change in the position transducer reading, the tension in the zero tension string 36 will be zero, and the actual string tension will be reacted by the tension pressure on the tension piston 70. This will be indicated on the force display 58.

Accordingly, the reader will see that the actual tension measuring device described in my above patent provides a capability which though sorely need by the tennis community has hitherto been lacking:

- it provides a direct measurement of the actual tension.
- it provides a measure of the tension in any particular string
- it provides a measure of string tension which does not depend on the string properties such as length, or elasticity.
- it provides a measure of string tension which does not depend on the size of the racquet, or the density of stringing,
- it provides a measure of string tension which can be used directly to decide whether or not the racquet needs to be restrung.
- it provides a measurement device which can be made in various sizes, and adjustable, so that the tension on almost any string on a tennis, racquetball, squash, badminton, or any other racquet could be measured.

Although the description above contains many specificities, these should not be construed as limiting the scope of the invention, but as merely providing illustrations of some of the presently preferred embodiments of this invention. Features have been shown in combinations to aid understanding, but could be combined in many other ways.

Thus the scope of the invention should be determined by the appended claims and their legal equivalents, rather than by the examples given.

I claim:

1. A method for measuring the actual tension in an elastic string such as in a strung racquet, comprising holding a first length of a string substantially a constant length, reducing the tension in a directly adjacent second length of string to zero, and measuring the force required to maintain said first length of string at a constant length whereby the force required to maintain said first length of string at a constant length is an indication of the actual string tension.

2. An apparatus for measuring the actual tension in an elastic string such as in a strung racquet comprising a first, second and third clamping means which grip the string, connecting means between said first and second clamping means which connecting means includes a means for maintaining substantially constant a first length of string between the first and second clamping means and a means to measure and indicate the force required to maintain said length, a connecting means between said first and third clamping means which includes a means for reducing a distance between the second and third clamping means, whereby the tension in a second length of string between the second and third clamping means is reduced to zero while said first length is kept substantially constant and the force required to maintain said first length at said substantially constant length is an indication of the actual string tension.

3. The apparatus according to claim 2 wherein the force measuring means is a strain gauged beam.

4. The apparatus according to claim 2 wherein the means for maintaining said first length of string between the first and second clamping means is comprised of an adjustable length bar to carry the load and a reference arm with a vernier scale to indicate changes in the length of said first length of string.

5. The apparatus according to claim 2 wherein the means for maintaining said first length of string between the first and second clamping means is comprised of an adjustable length bar to carry the load, and a dial gauge mounted to indicate changes in the length of said first length of string.

6. The apparatus of claim 2 wherein the means for force measuring and indicating is a calibrated spring balance.

7. The apparatus of claim 2 wherein the means for maintaining said first length of string between the first and second clamping means is a hydraulic piston-cylinder with a controlled pressure supply.

8. The apparatus of claim 7 wherein the hydraulic pressure supply is servo controlled to maintain said first length of string substantially constant and measurement is performed by a linear position transducer.

9. An apparatus for measuring the actual tension in an elastic string such as in a strung racquet, comprising three clamping means, two of which grip the string and one which grips the racquet rim, a connecting means between the first adjacent pair of clamping means which connecting means includes a means for maintaining substantially constant a first length of string between said first adjacent pair of clamping means and means to measure and indicate the force required to maintain said first length, a connecting means between the two outside clamping means which connecting means includes a means for reducing the distance between the two outside clamping means, whereby the tension in a second length of string between the second adjacent pair of clamping means is reduced to zero while said first length of string is kept substantially constant and the force required to maintain said first length of string at said substantially constant length is an indication of the actual string tension.

10. The apparatus according to claim 9 wherein the force measuring means is a strain gauged beam.

11. The apparatus according to claim 9 wherein the means for maintaining said first length of string between the first and second clamping means is comprised of an adjustable length bar to carry the load and a reference arm with a vernier scale to indicate changes in the length of said first length of string.

12. The apparatus according to claim 9 wherein the means for maintaining said first length of string between the first and second clamping means is comprised of an adjustable length bar to carry to load, and a dial gauge mounted to indicate changes in the length of said first length of string.

13. The apparatus of claim 9 wherein the means for force measuring and indicating is a calibrated spring balance.

14. The apparatus of claim 9 wherein the means for maintaining said first length of string between the first and second clamping means is a hydraulic piston-cylinder with a controlled pressure supply.

15. The apparatus of claim 14 wherein the hydraulic pressure supply is servo controlled to maintain said first length of string substantially constant and measurement is performed by a linear position transducer.

16. The apparatus of claim 7 wherein the means for maintaining said first length of string between the first and second clamping means and the means for reducing the distance between the first and third clamping means are both mounted on a single rim clamp.

17. The apparatus of claim 9 wherein the means for maintaining said first length of string between the first and second clamping means is mounted on a rim clamp at one end of the string being measured and the means for reducing the distance between the first and third clamping means is mounted on a rim clamp on the opposite end of the string being measured.

* * * * *